(12) United States Patent
McKee et al.

(10) Patent No.: US 11,737,467 B2
(45) Date of Patent: Aug. 29, 2023

(54) METHOD FOR COOKING IN A MODULAR COOKING APPLIANCE

(71) Applicant: Automation Tech, LLC, Elgin, IL (US)

(72) Inventors: Philip R. McKee, Dallas, TX (US); Andrew Podevels, Wauwatosa, WI (US); Harold Hansen, Plano, TX (US)

(73) Assignee: Automation Tech, LLC, Elgin, IL (US)

( * ) Notice: Subject to any disclaimer, the term of this patent is extended or adjusted under 35 U.S.C. 154(b) by 181 days.

(21) Appl. No.: 16/838,563

(22) Filed: Apr. 2, 2020

(65) Prior Publication Data

US 2021/0307336 A1    Oct. 7, 2021

(51) Int. Cl.
*A21B 1/40* (2006.01)
*A47J 27/12* (2006.01)
(Continued)

(52) U.S. Cl.
CPC .............. *A21B 1/40* (2013.01); *A21B 1/245* (2013.01); *A21B 1/26* (2013.01); *A47J 27/12* (2013.01);
(Continued)

(58) Field of Classification Search
CPC ....... F24C 7/087; F24C 11/00; A47J 2201/00; A47J 27/12; A47J 37/015; A21B 1/245; A21B 1/40; A21B 1/26
See application file for complete search history.

(56) References Cited

U.S. PATENT DOCUMENTS 2,104,024 A    1/1938   Conboie
3,557,333 A    1/1971   McAvoy
(Continued)

FOREIGN PATENT DOCUMENTS

CN    202209709 U    5/2012
CN    108459538 A    8/2018
(Continued)

OTHER PUBLICATIONS

Pacific Gas and Electric, PG&E End-Use Briefing, Ovens in Commercial Food Service Operations, May 1997 (Revised Dec. 10, 1999), pp. 1-9. USA.
(Continued)

*Primary Examiner* — Dana Ross
*Assistant Examiner* — Kuangyue Chen
(74) *Attorney, Agent, or Firm* — Amster, Rothstein & Ebenstein, LLP

(57) ABSTRACT

A method for cooking is disclosed. In response to an oven being selected to cook a food item, a determination is made whether or not any oven is being engaged in cooking. If no oven is being engaged in cooking, then temperature-control mode is utilized to control oven temperature of the selected oven. If one oven is currently being engaged in cooking, then another determination is made whether or not the total current demand by the two ovens to cook respective food items exceeds a predetermined current limitation under temperature-control mode. If the total current demand does not exceed the predetermined current limitation, then temperature-control mode is utilized to control oven temperature of the two ovens. If the total current demand exceeds the predetermined current limitation, then time-control mode is utilized to control oven temperature of the two ovens.

7 Claims, 12 Drawing Sheets

(51) Int. Cl.
*A47J 37/01* (2006.01)
*A21B 1/24* (2006.01)
*A21B 1/26* (2006.01)

(52) U.S. Cl.
CPC .......... *A47J 37/015* (2013.01); *A47J 2201/00* (2013.01)

(56) References Cited

U.S. PATENT DOCUMENTS

| | | |
|---|---|---|
| 3,884,213 A | 5/1975 | Smith |
| 4,154,861 A | 5/1979 | Smith |
| 4,246,462 A | 1/1981 | Meisel |
| 4,455,478 A | 6/1984 | Guibert |
| 4,566,804 A | 1/1986 | Collins et al. |
| 4,949,629 A | 8/1990 | Leary et al. |
| 4,972,824 A | 11/1990 | Luebeke et al. |
| 5,025,775 A | 6/1991 | Crisp |
| 5,039,535 A | 8/1991 | Lang et al. |
| 5,172,682 A | 12/1992 | Luebeke et al. |
| 5,223,008 A | 6/1993 | Troxell |
| 5,277,105 A | 1/1994 | Bruno et al. |
| 5,906,485 A | 5/1999 | Groff et al. |
| 5,994,683 A | 11/1999 | Braunisch et al. |
| 6,518,553 B1 | 2/2003 | Leykin et al. |
| 6,572,911 B1 | 6/2003 | Corcoran et al. |
| 6,691,698 B2 | 2/2004 | Gunawardena et al. |
| 6,712,064 B2 | 3/2004 | Stacy et al. |
| 7,220,944 B2 | 5/2007 | Miller |
| 8,093,538 B2 | 1/2012 | Claesson et al. |
| 8,319,160 B2 | 11/2012 | Koschberg et al. |
| 8,384,000 B2 | 2/2013 | Ruffing et al. |
| 8,578,585 B2 | 11/2013 | Dettloff |
| 9,163,877 B2 | 10/2015 | Lopez et al. |
| 9,288,997 B2 | 3/2016 | McKee |
| 9,516,704 B2 | 12/2016 | Stanger |
| 9,775,358 B2 | 10/2017 | McKee |
| 10,140,587 B2 | 11/2018 | Garden |
| 10,184,722 B1 | 1/2019 | Ingle |
| 10,492,641 B2 | 12/2019 | Kestner et al. |
| 10,684,022 B2 | 6/2020 | McKee et al. |
| 10,729,144 B2 | 8/2020 | McKee et al. |
| 11,011,909 B1* | 5/2021 | Gurin ..................... H02J 3/12 |
| 2003/0056658 A1 | 3/2003 | Jones et al. |
| 2005/0255208 A1 | 11/2005 | Shei |
| 2006/0007659 A1 | 1/2006 | Bell |
| 2006/0163238 A1 | 7/2006 | Miller |
| 2006/0266349 A1 | 11/2006 | Beck et al. |
| 2008/0092754 A1 | 4/2008 | Noman |
| 2008/0105136 A1 | 5/2008 | McFadden |
| 2008/0283035 A1 | 11/2008 | McKee et al. |
| 2009/0194090 A1 | 8/2009 | Kim et al. |
| 2010/0071565 A1 | 3/2010 | Backus et al. |
| 2010/0247721 A1 | 9/2010 | Mcghee, Jr. et al. |
| 2010/0276413 A1 | 11/2010 | Nam et al. |
| 2011/0114634 A1 | 5/2011 | Nevarez |
| 2011/0120990 A1 | 5/2011 | Heimerdinger |
| 2011/0139140 A1 | 6/2011 | Baker et al. |
| 2011/0241503 A1 | 10/2011 | Simon |
| 2012/0111857 A1 | 5/2012 | Mckee et al. |
| 2012/0308702 A1 | 12/2012 | Khatchadourian et al. |
| 2013/0008893 A1 | 1/2013 | Little et al. |
| 2013/0177683 A1 | 7/2013 | Shei et al. |
| 2014/0326710 A1 | 11/2014 | Mckee et al. |
| 2015/0017305 A1 | 1/2015 | Olver et al. |
| 2015/0096974 A1 | 4/2015 | Freeman et al. |
| 2015/0181655 A1 | 6/2015 | McKee et al. |
| 2016/0025350 A1 | 1/2016 | Goble et al. |
| 2016/0068689 A1 | 3/2016 | Lang |
| 2016/0215989 A1 | 7/2016 | Buller-Colthurst |
| 2016/0330978 A1 | 11/2016 | Schjerven, Sr. et al. |
| 2017/0095105 A1 | 4/2017 | Clark et al. |
| 2017/0095106 A1 | 4/2017 | Cook |
| 2017/0290345 A1 | 10/2017 | Garden et al. |
| 2017/0318629 A1 | 11/2017 | Mohseni |
| 2018/0004276 A1 | 1/2018 | Wong et al. |
| 2018/0103803 A1 | 4/2018 | Laub et al. |
| 2018/0152991 A1 | 5/2018 | Hall et al. |
| 2018/0235396 A1 | 8/2018 | Schönenberger |
| 2019/0050804 A1 | 2/2019 | Garden |
| 2019/0056118 A1 | 2/2019 | McKee et al. |
| 2019/0098921 A1 | 4/2019 | Park et al. |
| 2019/0117019 A1 | 4/2019 | Minard |
| 2019/0141798 A1 | 5/2019 | Cheng et al. |
| 2019/0166850 A1 | 6/2019 | Bailie |
| 2019/0223474 A1* | 7/2019 | Lee ........................ A23L 5/32 |
| 2019/0234617 A1 | 8/2019 | Bhogal et al. |
| 2019/0239517 A1 | 8/2019 | McKee et al. |
| 2019/0239518 A1 | 8/2019 | McKee et al. |
| 2019/0242587 A1 | 8/2019 | McKee et al. |
| 2019/0315224 A1 | 10/2019 | Mitidieri et al. |
| 2020/0037816 A1 | 2/2020 | Hackley |
| 2020/0064056 A1 | 2/2020 | Hall et al. |
| 2020/0090226 A1 | 3/2020 | Garden et al. |
| 2020/0187510 A1 | 6/2020 | Wolfe et al. |
| 2020/0200393 A1* | 6/2020 | Goldberg .............. B60P 3/0257 |
| 2021/0307335 A1 | 10/2021 | McKee et al. |
| 2021/0307336 A1 | 10/2021 | McKee et al. |
| 2021/0307560 A1 | 10/2021 | McKee et al. |
| 2021/0310660 A1 | 10/2021 | McKee et al. |
| 2021/0310662 A1 | 10/2021 | McKee et al. |

FOREIGN PATENT DOCUMENTS

| | | |
|---|---|---|
| DE | 19750488 A1 | 5/1999 |
| DE | 10027072 A1 | 1/2002 |
| EP | 3190857 B1 | 4/2020 |
| GB | 120631 A | 11/1918 |
| JP | 201484919 A2 | 5/2014 |
| WO | 2005096826 A1 | 10/2005 |
| WO | 2007015215 A2 | 2/2007 |
| WO | 2018112597 A1 | 6/2018 |
| WO | 2019050615 A1 | 3/2019 |

OTHER PUBLICATIONS

International Searching Authority, Notification of Transmittal of the International Search Report and the Written Opinion of the International Searching Authority, or the Declaration, PCT/US21/24607, dated Jun. 24, 2021, 12 pp., United States.

International Searching Authority, Notification of Transmittal of the International Search Report and the Written Opinion of the International Searching Authority, or the Declaration, PCT/US21/24614, dated Jun. 23, 2021, 9 pp., United States.

International Searching Authority, Notification of Transmittal of the International Search Report and the Written Opinion of the International Searching Authority, or the Declaration, PCT/US21/24618, dated Jun. 23, 2021, 10 pp., United States.

International Searching Authority, Notification of Transmittal of the International Search Report and the Written Opinion of the International Searching Authority, or the Declaration, PCT/US21/24630, dated Jul. 9, 2021, 7 pp., United States.

International Searching Authority, Notification of Transmittal of the International Search Report and the Written Opinion of the International Searching Authority, or the Declaration, PCT/US21/24639, dated Jul. 12, 2021, 7 pp., United States.

International Searching Authority, Notification of Transmittal of the International Search Report and the Written Opinion of the International Searching Authority, or the Declaration, PCT/US21/24712, dated Jul. 7, 2021, 10 pp., United States.

International Searching Authority, Notification of Transmittal of the International Search Report and the Written Opinion of the International Searching Authority, or the Declaration, PCT/US21/24714, dated Jun. 28, 2021, 10 pp., United States.

International Searching Authority, Notification of Transmittal of the international Search Report and the Written Opinion of the International Searching Authority, or the Declaration, PCT/US21/24715, dated Jun. 29, 2021, 8 pp., United States.

International Searching Authority, Notification of Transmittal of the International Search Report and the Written Opinion of the International Searching Authority, or the Declaration, PCT/US2021/

(56) References Cited

OTHER PUBLICATIONS 025339, dated Jul. 12, 2021, 11 pp., United States.
United States Patent and Trademark Office, Office Action for U.S. Appl. No. 16/997,402, dated Dec. 8, 2021, 11 pp., United States.

* cited by examiner

| FOOD ENTRY TABLE | | | | | | | | | | | | | | | | |
|---|---|---|---|---|---|---|---|---|---|---|---|---|---|---|---|---|
| OVEN MODULE | FOOD TYPE | COOK STAGE 1 | | | | | COOK STAGE 2 | | | | | COOK STAGE 3 | | | | |
| | | From | To | Temp | Blower | Mag | From | To | Temp | Blower | Mag | From | To | Temp | Blower | Mag |
| impingement | pizza | 0 | 30 | 400 | 50 | | 31 | 50 | 400 | 100 | | 51 | 90 | 425 | 80 | |
| impingement | sandwich | 0 | 20 | 425 | 100 | | 21 | 50 | 400 | 100 | | 51 | 70 | 425 | 60 | |
| convection | biscuits | 0 | 50 | 350 | 100 | | 51 | 100 | 350 | 100 | | 101 | 120 | | | |
| microwave | hot dog | 0 | 50 | | | 100 | 51 | 70 | | | 0 | 71 | 90 | | | 50 |

Figure 8A

| MAXIMUM CURRENT DRAWN TABLE | | | | |
|---|---|---|---|---|
| OVEN MODULE | FOOD TYPE | COOK STAGE 1 | COOK STAGE 2 | COOK STAGE 3 |
| impingement | pizza | 32 | 32 | 32 |
| Impingement | sandwich | 32 | 32 | 32 |
| convection | biscuits | 28 | 28 | 28 |
| microwave | hot dog | 16 | 0 | 8 |

Figure 8B

| CURRENT DRAWN HISTORY TABLE | | | | | | | | | |
|---|---|---|---|---|---|---|---|---|---|
| OVEN MODULE | FOOD TYPE | Time Unit 1 | Time Unit 2 | Time Unit 3 | Time Unit 4 | Time Unit 5 | Time Unit 6 | Time Unit 7 | Time Unit 8 |
| impingement | pizza | 3.2 | 5.6 | 5.6 | 5.6 | 5.6 | 5.6 | 2.8 | 2.8 |
| impingement | sandwich | 5.6 | 5.6 | 5.6 | 5.6 | 5.6 | 5.6 | | |
| convection | biscuits | 2.8 | 2.8 | 3.2 | 3.2 | 3.2 | 3.2 | 3.2 | 3.2 |

Figure 8C

METHOD FOR COOKING IN A MODULAR COOKING APPLIANCE

RELATED APPLICATIONS

The present application is related to
1. Ser. No. 15/838,540, entitled "MODULAR COOKING APPLIANCE," filed on Apr. 2, 2020; and
2. Ser. No. 15/838,589, entitled "MODULAR COOKING APPLIANCE HAVING AN AUTO-LOADING MICROWAVE OVEN," filed on Apr. 2, 2020,
all are assigned to the assignee of the present application.

TECHNICAL FIELD

The present invention relates to method for cooking in general, and in particular to a method for cooking in a modular cooking appliance having multiple ovens.

BACKGROUND

In order to cook and serve a wide variety of food items, such as pizzas, bakery products, breakfast sandwiches, proteins, etc., food-service operators generally have to possess different kinds of ovens at the same store location. Different operating skills are typically required to utilize each of the different kinds of ovens for cooking, and multiple ovens tend to occupy valuable countertop spaces and require multiple electrical power plugs.

The present disclosure provides an improved cooking appliance that can streamline the cooking task of a food-service operator.

SUMMARY OF THE INVENTION

In accordance with one embodiment of the present invention, in response to an oven within a modular cooking appliance having multiple ovens being selected to cook a food item, a determination is made whether or not any of the ovens is currently being engaged in cooking. If none of the ovens is currently being engaged in cooking, then temperature-control mode is utilized to control oven temperature of the selected oven throughout the entire cook process. If one of the ovens is currently being engaged in cooking, then another determination is made whether or not the total current demand by the engaged oven and the selected oven to cook respective food items could exceed a predetermined current limitation anytime during their entire respective cook cycle under temperature-control mode. If the total current demand could not exceed the predetermined current limitation, then temperature-control mode is utilized to control oven temperature of the engaged oven and the selected oven throughout their entire respective cook cycle. If the total current demand could exceed the predetermined current limitation, then time-control mode is utilized to control oven temperature of the engaged oven and the selected oven throughout their entire respective cook cycle.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 8A shows an example of a Food Entry Table within the modular cooking appliance from FIG. 1;

FIG. 8B shows an example of a Maximum Current Drawn Table within the modular cooking appliance from FIG. 1;

FIG. 8C shows an example of a Current Drawn History Table within the modular cooking appliance from FIG. 1.

DETAILED DESCRIPTION OF A PREFERRED EMBODIMENT

I. Configuration of Modular Cooking Appliance

Figure 1:
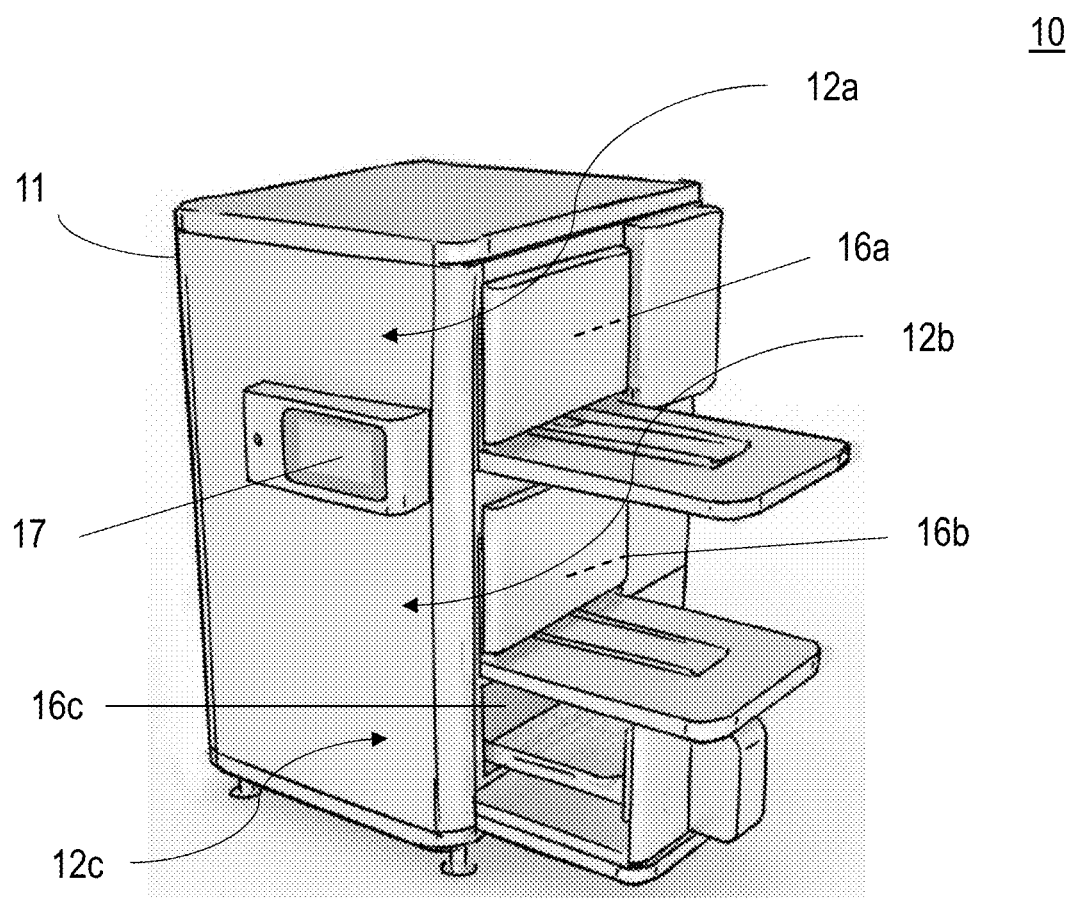
FIG. 1 is an isometric view of a modular cooking appliance, in accordance with one embodiment.

Referring now to the drawings and in particular to FIG. 1, there is depicted an isometric view of a modular cooking appliance, in accordance with one embodiment. As shown, a modular cooking appliance 10 is defined by a housing 11 containing multiple interchangeable cooking modules. For the present embodiment, housing 11 includes interchangeable cooking modules 12a-12c, but it is understood by those skilled in the art that the number of interchangeable cooking modules within housing 11 can be more or less than three. Each of interchangeable cooking modules 12a-12c is for receiving an oven. The ovens contained within interchangeable cooking modules 12a-12c may be identical or different from each other. For the present embodiment, interchangeable cooking module 12a contains an impingement oven that may be used to cook pizzas, interchangeable cooking module 12b contains a convection oven that may be used to cook more delicate yeast-rising food items such as cinnamon rolls, and interchangeable cooking module 12c contains a microwave oven that may be used to cook hot dogs.

Alternatively, interchangeable cooking module 12*a* may contain a first convection oven, interchangeable cooking module 12*b* may contain a second convection oven, and interchangeable cooking module 12*c* may contain an impingement oven. Basically, modular cooking appliance 10 may contain any combination of ovens based on the preferences of food-service operators. Any one of interchangeable cooking modules 12*a*-12*c* contained within modular cooking appliance 10 can be swapped out by field service personnel without disturbing other aspects of modular cooking appliance 10.

For the present embodiment, the heights of interchangeable cooking modules 12*a*-12*c* are identical such that the height of housing 11 corresponds to a total number of interchangeable cooking modules installed. Alternatively, the heights of interchangeable cooking modules 12*a*-12*c* may vary from each other, depending on the type of oven contained within. For example, a convection oven that cooks yeast-raised products may be taller than an impingement oven that cooks pizzas. Accordingly, the height of housing 11 will correspond to the total height of the ovens contained within.

Interchangeable cooking modules 12*a*-12*c* include openings 16*a*-16*c*, respectively, to allow food items to be transported into ovens located within interchangeable cooking modules 12*a*-12*c*.

Modular cooking appliance 10 includes a common control panel 17 for controlling all the various ovens and food loading mechanisms contained within interchangeable cooking module 12*a*-12*c*. Each of the food loading mechanisms allows food items to be loaded within a cooking chamber of a respective oven. After food items have been placed on a food loading mechanism, an operator can enter operating parameters, such as cooking temperature, cooking time, blower speed, etc., via control panel 17 to effectuate cooking controls on the food items to be cooked, and the food loading mechanism will automatically transport the food items into the oven to begin cooking.

Alternatively, food items can be manually placed within a cooking chamber of an oven by an operator, without using a food loading mechanism or when there is no food loading mechanism attached to an oven.

Control panel 17 is preferably implemented with a touchscreen but it can also be implemented with keypads and liquid crystal display (LCD) that are well-known in the art.

Figure 1A:
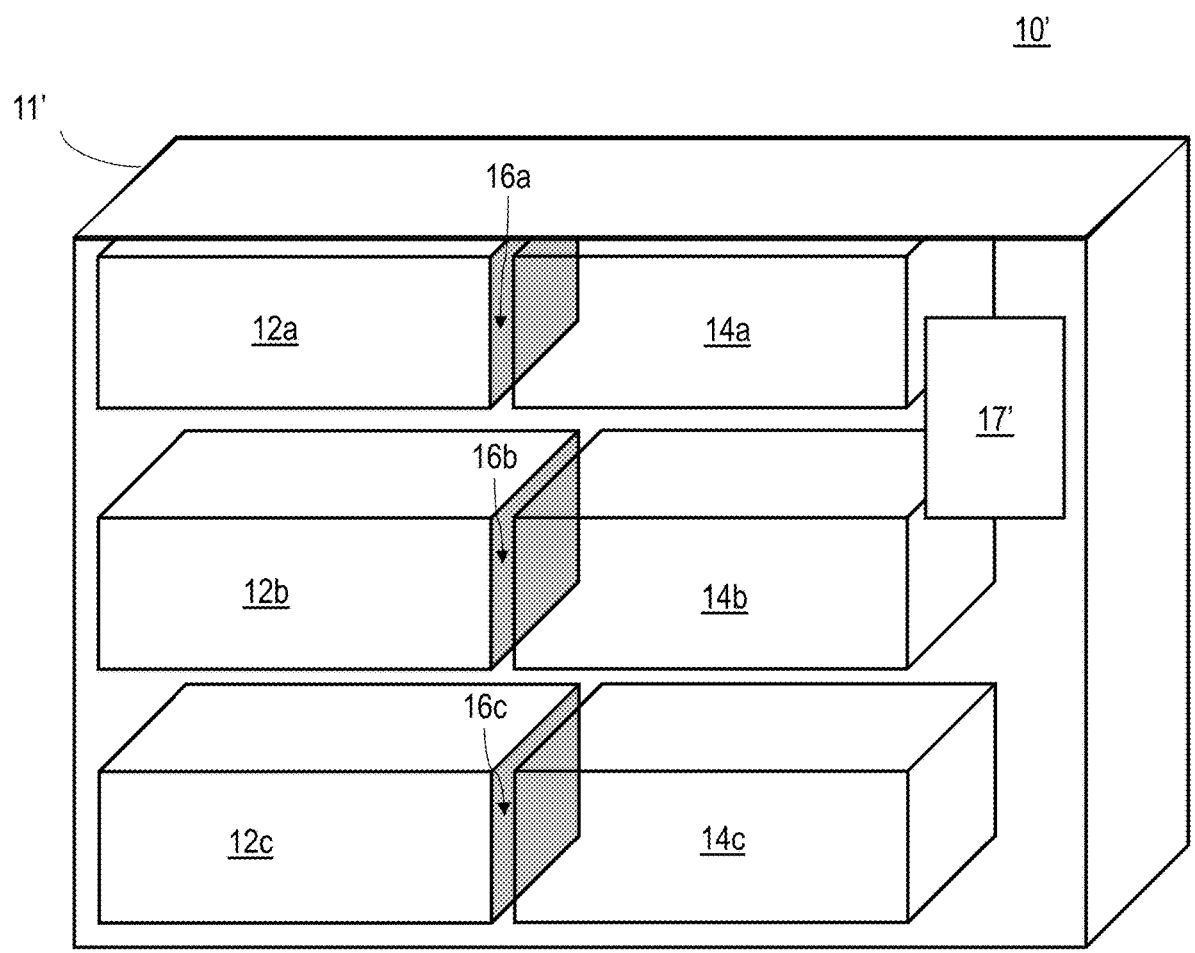
FIG. 1A is an isometric view of the structure of a modular cooking appliance, according to an alternative embodiment.

Referring now to FIG. 1A, there is depicted an isometric view of the structure of modular cooking appliance 10, in accordance with an alternative embodiment. As shown, a modular cooking appliance 10' is defined by a housing 11' containing interchangeable cooking modules 12*a*-12*c*. Each of interchangeable cooking modules 12*a*-12*c* is for receiving an oven, such as a microwave oven, a convection oven, an impingement oven or the like.

Each of interchangeable cooking modules 12*a*-12*c* is associated with one of front-facing slots 14*a*-14*c*, respectively. Openings 16*a*-16*c* allow food items to be transported between ovens located within interchangeable cooking modules 12*a*-12*c* and their associated front-facing slots 14*a*-14*c*. For example, each of front-facing slots 14*a*-14*c* may contain a food loading mechanism for transporting food placed thereon to ovens contained within adjacent interchangeable cooking modules 12*a*-12*c* via corresponding openings 16*a*-16*c*, respectively. Specifically, food placed on a food loading mechanism contained in front-facing slot 14*a* will be transported into an oven contained in interchangeable cooking module 12*a*, food placed on a food loading mechanism contained in front-facing slot 14*b* will be transported into an oven contained in interchangeable cooking module 12*b*, and food placed on a food loading mechanism contained in front-facing slot 14*c* will be transported into an oven contained in interchangeable cooking module 12*c*. After food has been cooked, the food can be returned by the food loading mechanism back to the front-facing slot from which it entered the associated oven.

Modular cooking appliance 10' includes a common control panel 17' for controlling all the various ovens and food loading mechanisms contained within interchangeable cooking module 12*a*-12*c* and front-facing slot 14*a*-14*c*, respectively.

A. Interchangeable Cooking Module

The basic construction of interchangeable cooking modules 12*a*-12*c* are substantially identical to each other. Thus, the basic construction of only interchangeable cooking module 12*a* will be further described in details.

Figure 1B:
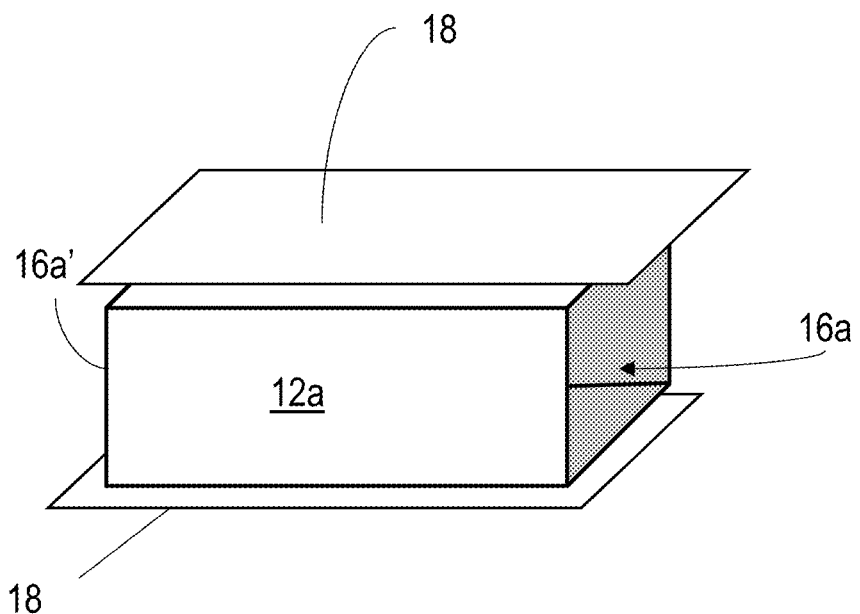
FIG. 1B is an isometric view of an interchangeable cooking module within the modular cooking appliance from FIG. 1A, according to one embodiment.

With reference now to FIG. 1B, there is illustrated an isometric view of interchangeable cooking module 12*a*, in accordance with one embodiment. As shown, interchangeable cooking module 12*a* includes a space for containing an oven (not shown) and two openings, such as openings 16*a* and 16*a*', on both ends of the space for containing an oven. Along the longitudinal axis, the upper half of interchangeable cooking module 12*a* is substantially identical to the lower half of interchangeable cooking module 12*a* such that either opening 16*a* or opening 16*a*' can be used for passage of food items, depending on the orientation of interchangeable cooking module 12*a* within housing 11. During assembly, one of openings 16*a* and 16*a*' can be closed up with a back wall (see FIG. 1C), after the orientation of interchangeable cooking module 12*a* within housing 11 has been decided.

The top and bottom of interchangeable cooking module 12*a* are formed by insulating surfaces 18. Insulating surfaces 18 include a filling envelope that can be filled with a substance of high specific-heat. For example, after an oven has been placed within interchangeable cooking module 12*a*, a liquid containing a high specific-heat substance in suspension, such as sand or salt suspended in silicone, can be injected into the filling envelope within insulating surfaces 18 until insulating surfaces 18 are fully expanded into the space between insulating surfaces 18 and the oven. Heat energy is stored in the high specific-heat substance when the oven is being heated.

Figure 1C:
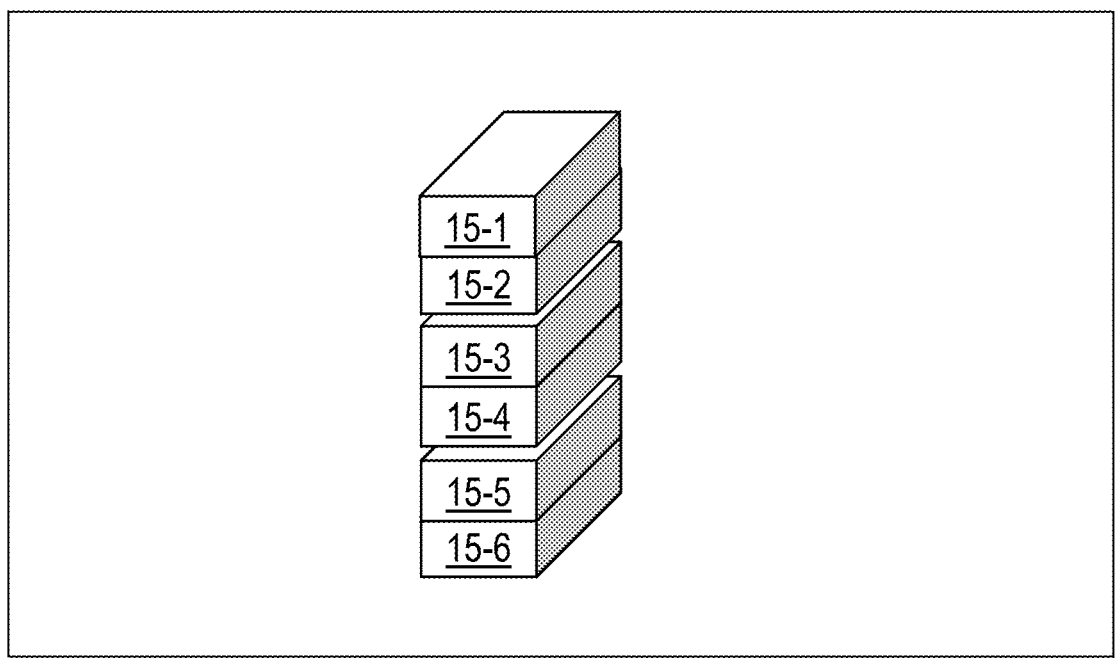
FIG. 1C is an isometric view of a back wall within the interchangeable cooking module from FIG. 1B, according to one embodiment.

Referring now to FIG. 1C, there is illustrated an isometric view of a back wall within interchangeable cooking module 12*a* from FIG. 1B, in accordance with one embodiment. As shown, a back wall includes a set of connectors 15-1 to 15-6. During assembly, an oven module to be placed within interchangeable cooking module 12*a* is fully seeded therein in order to achieve a connection between a subset of connectors 15-1 to 15-6 and the oven module. Each oven type includes a specific set of electrical connectors to be mated with the corresponding ones of connectors 15-1 to 15-6 in order to activate the proper electrical and control network for the operations of the oven. For example, an impingement oven includes electrical connectors for mating with connectors 15-1 and 15-4, a convection oven includes electrical connectors for mating with connectors 15-2 and 15-5, and a microwave oven includes electrical connectors for mating with connectors 15-3 and 15-6.

B. Impingement Oven

Figure 2A:
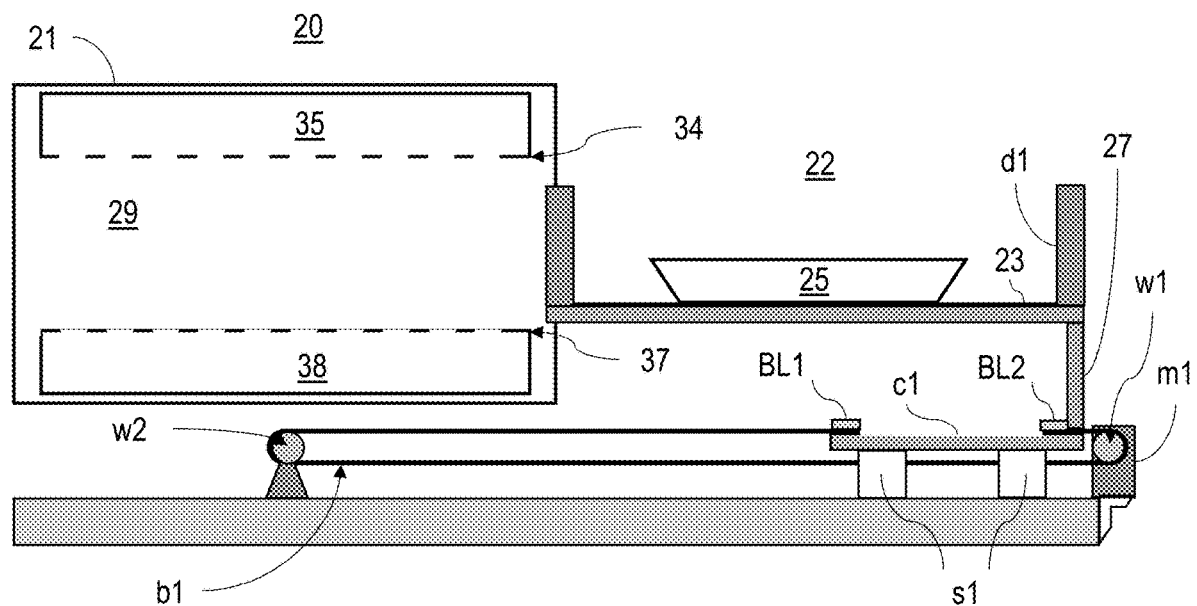
FIGS. 2A-2C are cross-sectional views of an impingement oven within the modular cooking appliance from FIG. 1, according to one embodiment.
Figure 2B:
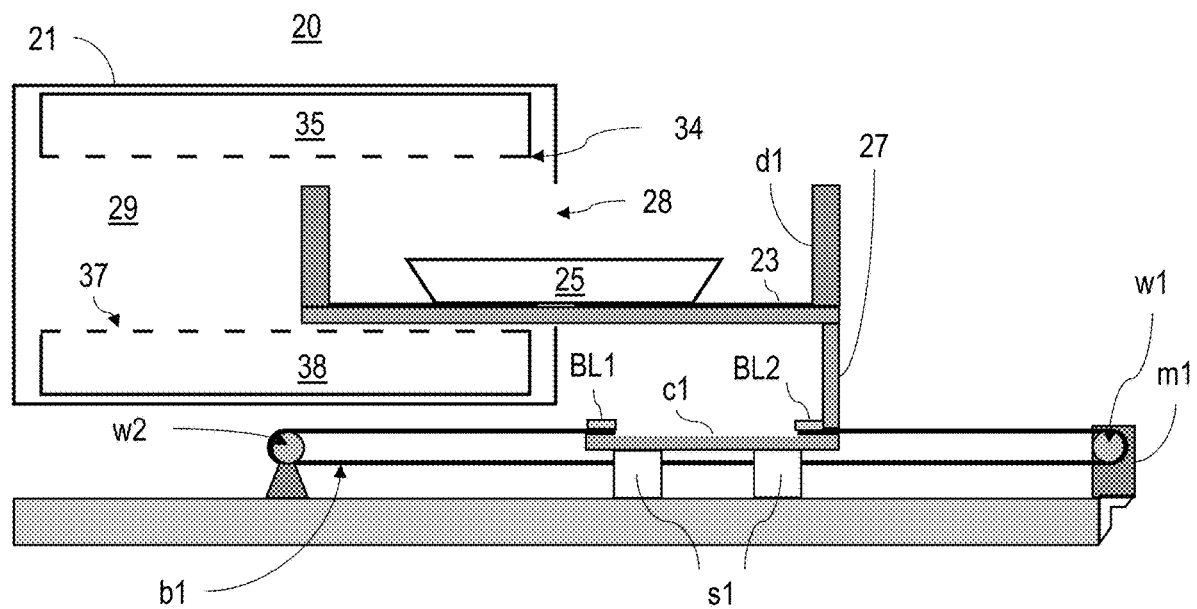
Figure 2C:
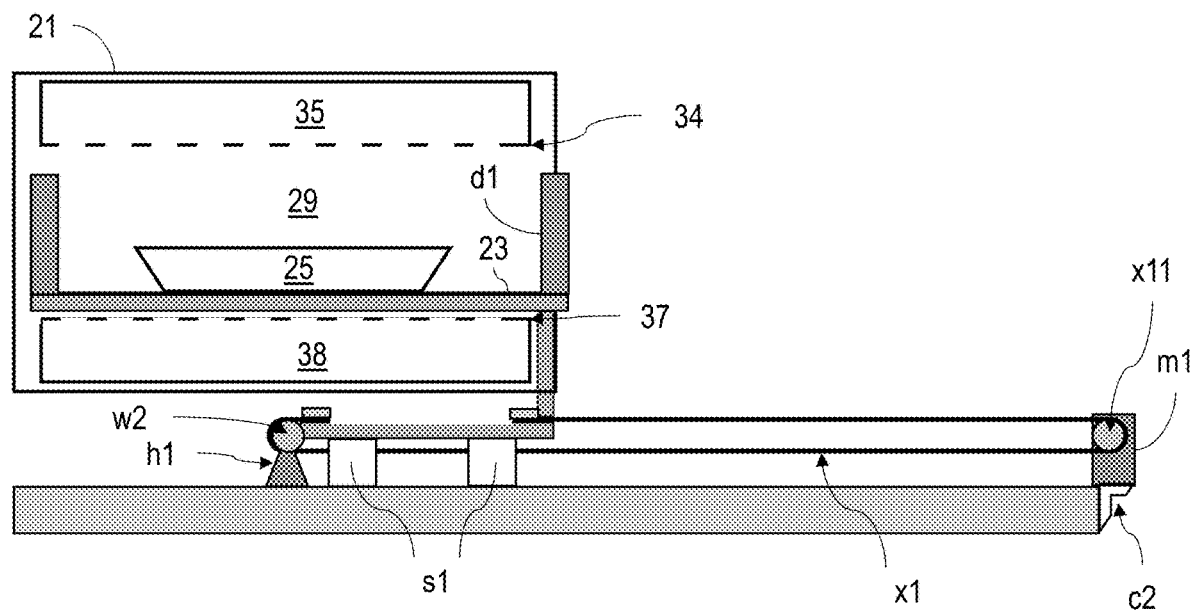

With reference now to FIGS. 2A-2C, there are depicted cross-sectional views of an impingement oven within interchangeable cooking module 12*a* of modular cooking appliance 10 from FIG. 1, in accordance with one embodiment.

As shown, an impingement oven 20 includes a housing 21 for accommodating a cavity 29 and a cavity opening 28. Impingement oven 20 also includes a substantially planar food loading platform 23. Food loading platform 23 is configured to receive a cooking plate 25. Any food item intended to be cooked by impingement oven 20 is initially placed on either cooking plate 25 or food loading platform 23. When food items are being cooked, food loading platform 23 and cooking plate 25 are located inside cooking cavity 29, as shown in FIG. 2C.

In addition, housing 21 also contains a top plenum 35 and a bottom plenum 38. Top plenum 35 is connected to top air inlet plate 34. Bottom plenum 38 is connected to a bottom air inlet plate 37. Top air inlet plate 34, top plenum 35, bottom air inlet plate 37 and bottom plenum 38 are part of the heating and airflow system for impingement oven 20 such that heated air in top plenum 35 and bottom plenum 38 are in gaseous communication with cavity 29 through top air inlet plate 34 and bottom air inlet plate 37, respectively. Top air inlet plate 34 and bottom air inlet plate 37 include multiple openings for directing hot pressured airstream towards any food items placed on food loading platform 23 located within cavity 29. It is understood by those skilled in the art that top plenum 35 or bottom plenum 38 could be in gaseous communication with cavity 29 via a variety of air opening configurations such as circular openings, nozzles, tubes, rectangular openings and the like. Moreover, air can enter cavity 29 through only one of top plenum 35 or bottom plenum 38.

Impingement oven 20 is also associated with a food transport system 22. As shown, food transport system 22 includes food loading platform 23 connected to a food transport carriage c1 via a connector 27. Food loading platform 23 can be transported in and out of cooking cavity 29 by a belt drive mechanism that includes a belt b1, a belt drive wheel w1 that is driven by a belt drive motor m1 and an opposing belt wheel w2. Belt b1 is connected to carriage c1 via belt locks BL1 and BL2. Carriage c1 is connected to carriage skids s1. For the present embodiment, there are four carriage skids connected to carriage c1, with two front carriage skids s1, as shown in FIG. 2A, and two back carriage skids (not shown) on the opposing side of carriage c1. Belt b1 moves between front carriage skids s1 and back carriage skids. When belt drive motor m1 is engaged, belt b1 moves carriage c1, thereby transporting food loading platform 23 in and out of cooking cavity 29 through opening 28, as shown in FIG. 2B.

During the cooking process, food loading platform 23 may be moved to and fro, about 1", for promoting food cooking evenness. In order to move food loading platform 23 to and fro without air escaping through opening 28 during the cooking process, door dl must be sufficiently thick to substantially block air from escaping through opening 28 at either extreme of the to and fro motion.

Operating parameters for impingement oven 20 to cook any food items placed on cooking plate 25 to be carried into cooking cavity 29 can be entered via control panel 17 (from FIG. 1).

Figure 3:
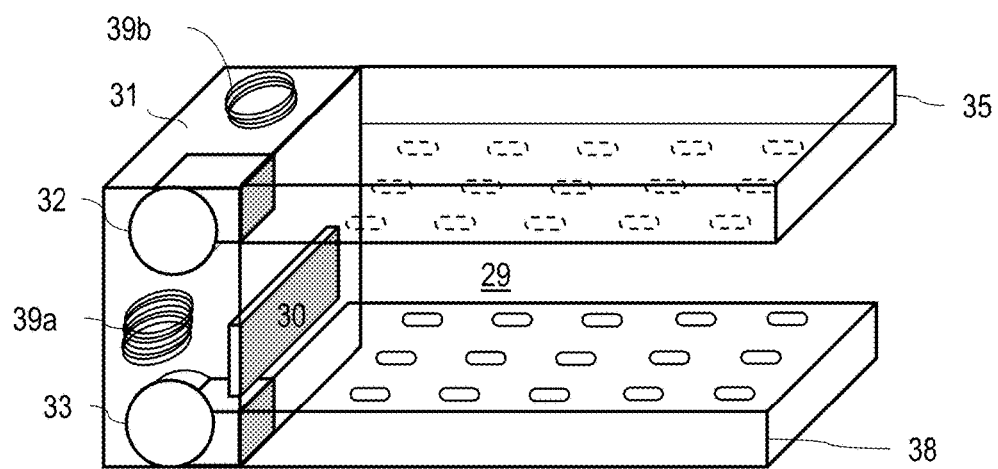
FIG. 3 is a diagram of the heating and airflow system within the impingement oven from FIGS. 2A-2B, according to one embodiment.

With reference now to FIG. 3, there is depicted a diagram of the heating and airflow system within impingement oven 20, in accordance with one embodiment. Air within cooking cavity 29 is initially pumped in to a heater plenum 31 via an intake opening 30. Heater plenum 31 includes a base heater 39a and a boost heater 39b. After air has been sufficiently heated by base heater 39a and boost heater 39b, the heated air is then directed to top plenum 35 via a top blower 32 and to a bottom plenum 38 via a bottom blower 33. During cooking, base heater 39a is usually turned on, and boost heater 39b is only activated when necessary. The pressurized hot air formed within top plenum 35 is subsequently directed to cavity 29 via multiple openings located on top air inlet plate 34 (from FIGS. 2A-2C). Similarly, pressurized hot air formed within bottom plenum 38 is subsequently directed to cavity 29 via multiple nozzles located on bottom air inlet plate 37 (from FIGS. 2A-2C). Although heated air is shown to be sent to top air plenum 35 and bottom plenum 38 via separate blowers, it is understood by those skilled in the art that heated air can be sent to both top plenum 35 and bottom plenum 38 via a single blower.

C. Convection Oven

Figure 4:
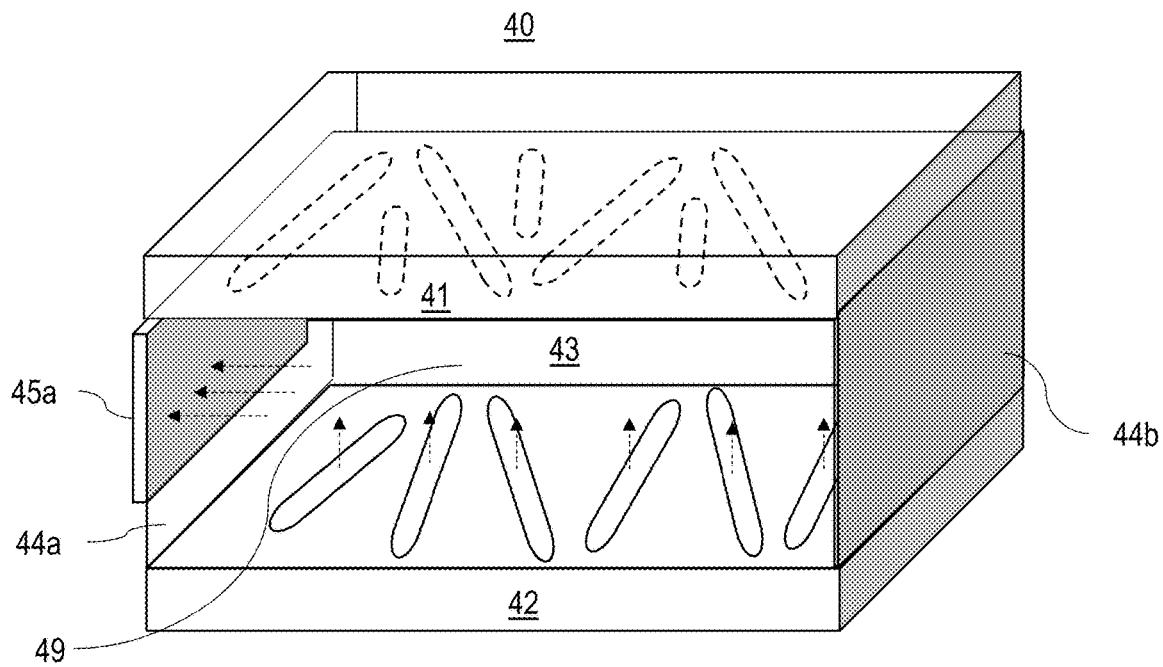
FIG. 4 is an isometric view of a convection oven within the modular cooking appliance from FIG. 1, according to one embodiment.

With reference now to FIG. 4, there is depicted an isometric view of a convection oven within slot 12b of modular cooking appliance 10 from FIG. 1, in accordance with one embodiment. As shown, a convection oven 40 includes a housing having a cooking cavity 49 defined by a top air inlet plenum 41, a bottom air inlet plenum 42, a rear wall 43, and two side walls 44a, 44b. Located on one or more of side walls 44a, 44b and rear wall 43 are return air openings, such as openings 45a, for returning air to a blower system (not shown). Preferably, convection oven 40 also includes a food loading mechanism similar to food loading mechanism 22 shown in FIGS. 2A-2C.

Figure 5:
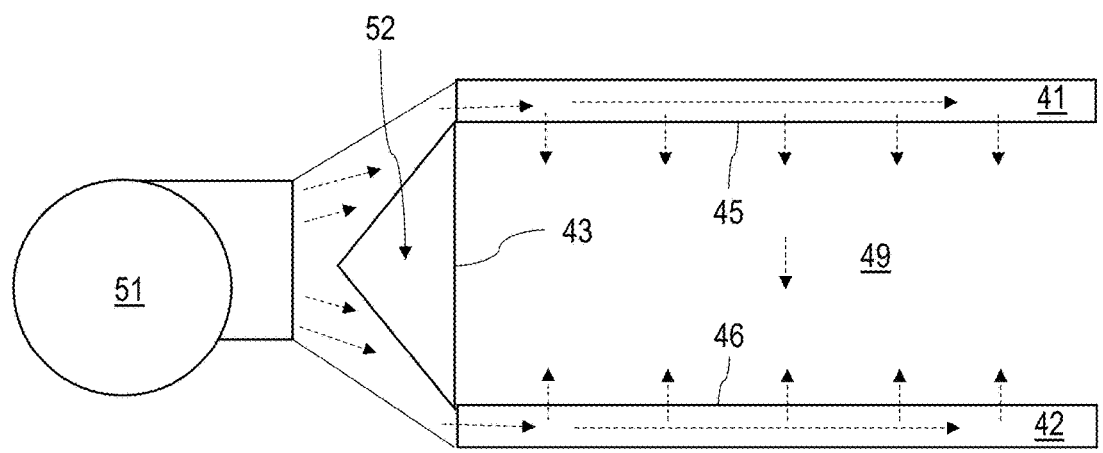
FIG. 5 is a diagram of a heating and airflow system within the convection oven from FIG. 4, according to one embodiment.

Referring now to FIG. 5, there is depicted a cross-sectional view of a heating and airflow system within convection oven 40, in accordance with one embodiment. As shown, a blower 51 is preferably located at the rear of convection oven 40. Heated air from a heater (not shown) is directed by blower 51 over triangular air diverter 52 that separates the air exiting blower 51 into top and bottom airstreams flowing through top and bottom air inlet plenums 41 and 42 and into cooking cavity 49 through top and bottom convection plates 45 and 46. After transferring heat from the heated air to food placed in cooking cavity 49, the air is drawn through return a return air path.

An operator can enter commands, such as cooking temperature, cooking time, fan speed, etc., via control panel 17 (from FIG. 1) to effectuate cooking controls on any food items placed within cooking cavity 49 of convection oven 40.

D. Microwave Oven

Figure 6A:
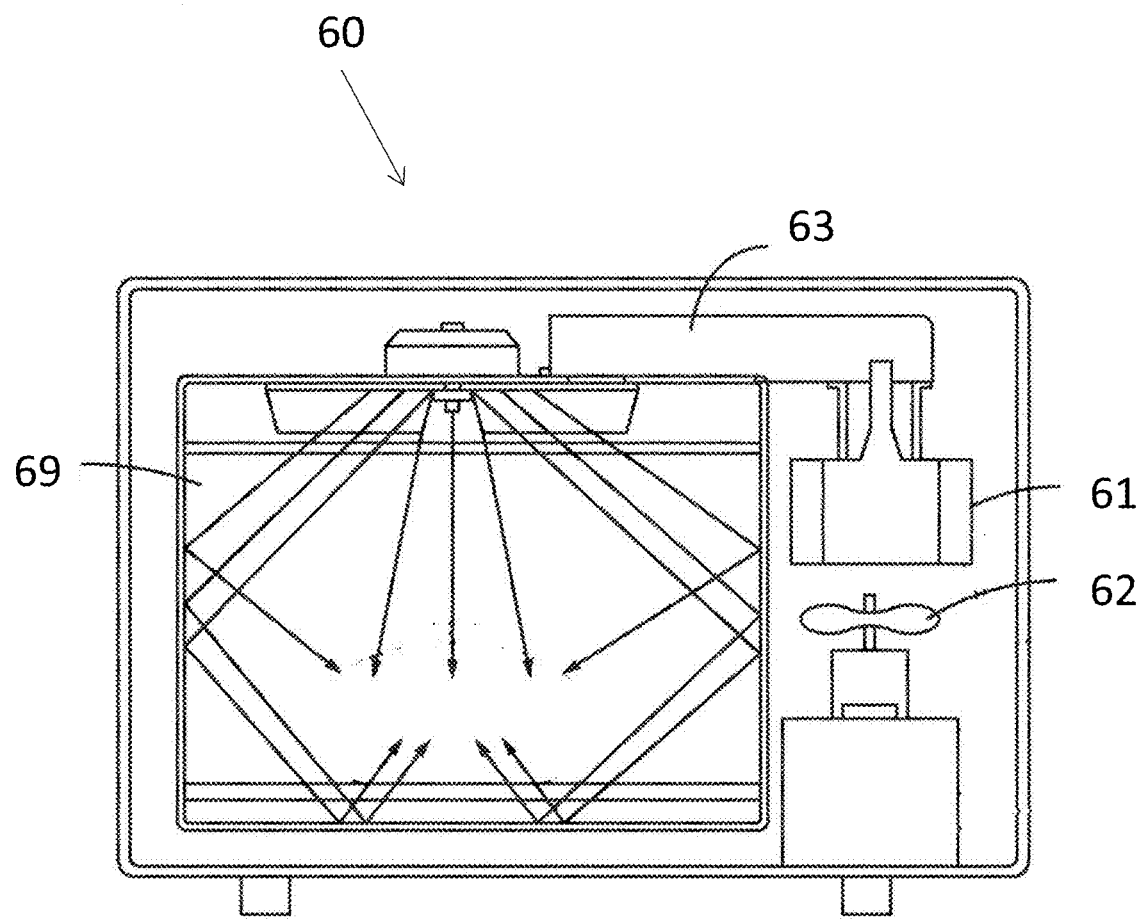
FIG. 6A is a front cross-sectional view of a microwave oven within the modular cooking appliance from FIG. 1, according to one embodiment.

With reference now to FIG. 6A, there is illustrated a front cross-sectional view of a microwave oven within interchangeable cooking module 12c of modular cooking appliance 10 from FIG. 1, according to one embodiment. As shown, a microwave oven 60 includes a cooking chamber 69 and at least one magnetron 61 configured to generate microwave radiation for cooking chamber 69. Microwave oven 60 may also include a second magnetron (not shown) that may be activated concurrently with, or independently from magnetron 61. Microwave oven 60 may further include one or more fans 62 for cooling magnetron 61 and/or generate air flow for more even heat distribution within cooking chamber 69. In some embodiments, microwave oven 60 further includes a waveguide 63 configured to direct and/or distribute the microwave radiation generated by magnetron 61 into cooking chamber 69.

Figure 6B:
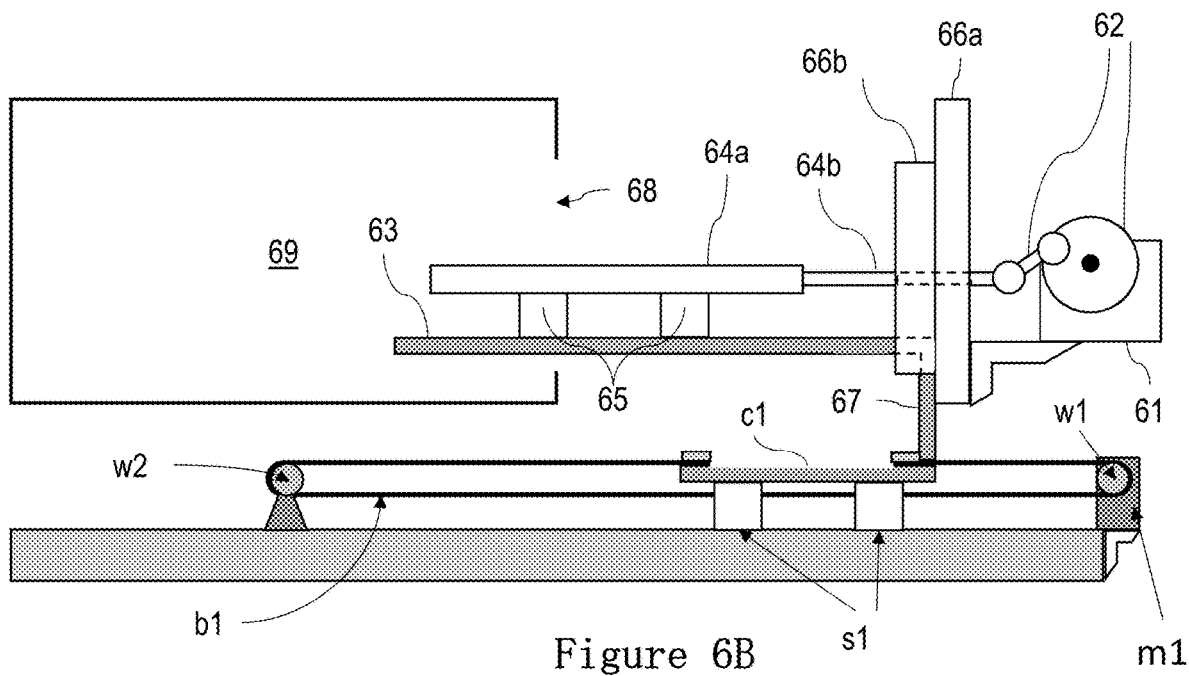
FIGS. 6B-6D are cross-sectional views of a food transport system within the microwave oven from FIG. 6A, according to one embodiment.
Figure 6C:
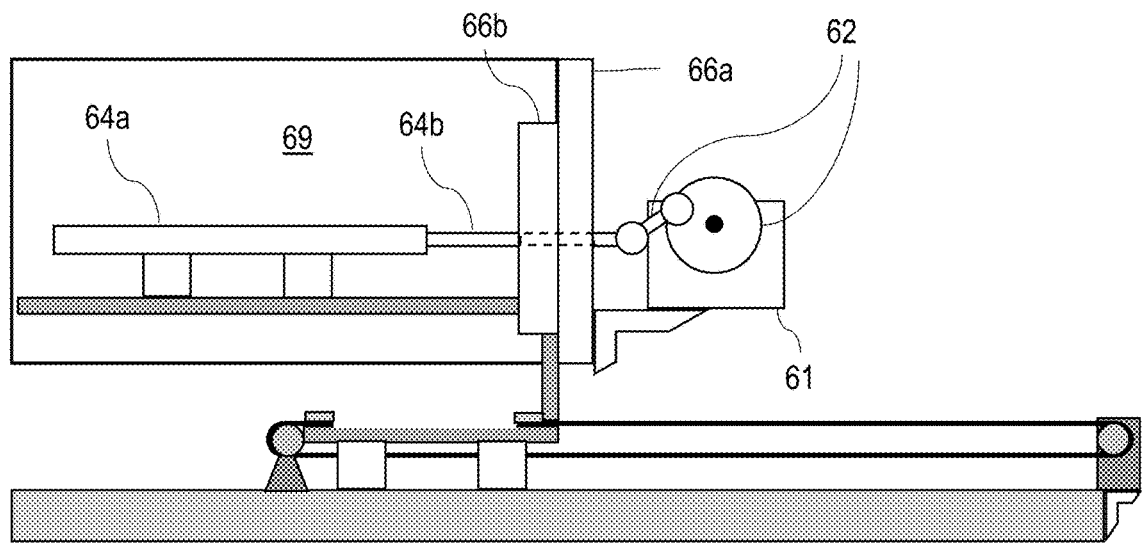
Figure 6D:
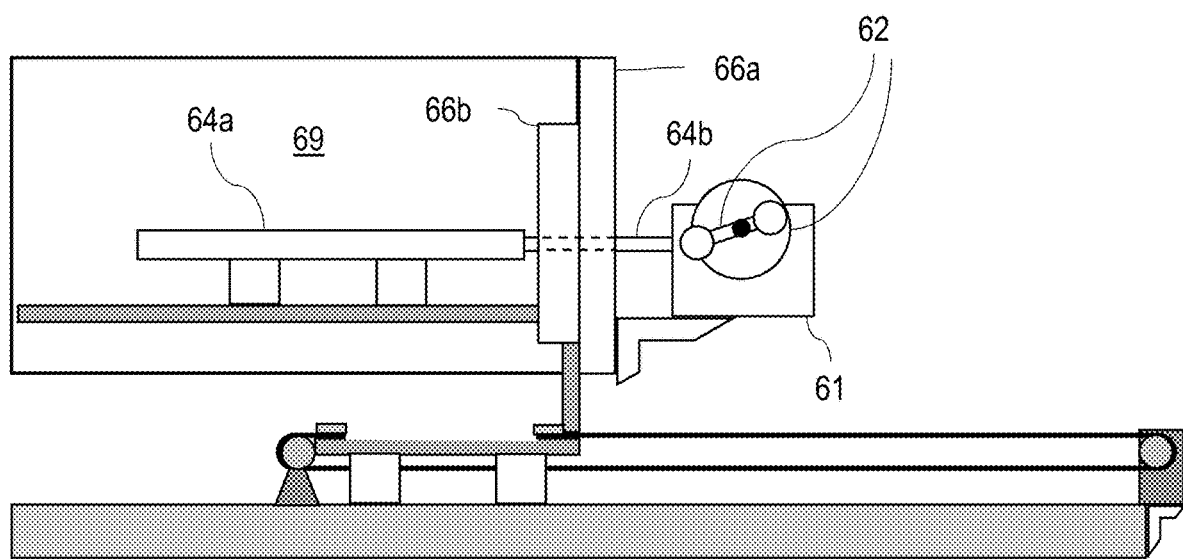

With reference now to FIGS. 6B-6D, there is illustrated cross-sectional views of a food transport and cooking evenness mechanism for microwave oven 60, according to one embodiment. As shown, a platform 63 is connected to a food transport carriage c1 via a connector 67. Platform 63 can be transported in and out of cooking cavity 69 by a belt drive mechanism that includes a belt b1, a belt drive wheel w1 that is driven by a belt drive motor m1 and an opposing belt wheel w2. Carriage c1 is connected to carriage skids s1. For the present embodiment, there are four carriage skids connected to carriage c1, with two front carriage skids s1, as shown in FIG. 6B, and two back carriage skids (not shown) on the opposing side of carriage c1. Belt b1 moves between front carriage skids s1 and back carriage skids. When belt drive motor m1 is engaged, belt b1 moves carriage c1, thereby transporting platform 63 in and out of cooking cavity 69 through opening 68, as shown in FIG. 6B.

Food surface 64a is connected to and supported by skids 65 which rest on platform 63. Food may be placed directly on food surface 64a or preferably on a dish or plate (not shown) which is then placed on food surface 64a. Food surface 64a is connected to crank-and-cam mechanism 62 via rod 64b which penetrates door 66a and door shunt 66b.

During cooking, as shown in FIGS. 6C-6D, food surface 64a may be moved to and fro within cooking chamber 69 for promoting food cooking evenness. In order to move food surface 64a to and fro within cooking chamber 69, a motor 61 and a crank-and-cam mechanism 62 are utilized to move a rod 64b connected to food surface 64a. Motor 61 is located outside an oven door formed by an external cover 66a and an internal cover 66b. External cover 66a and internal cover 66b are specifically designed to prevent microwave radiation from escaping through opening 68 during the cooking process. Two small concentric openings, which are approximately 0.3 inch in diameter, are provided in external cover 66a and internal cover 66b to allow rod 64b to go through. The wavelength of microwaves is approximately 12 cm, and the diameter of each of the two small concentric openings needs to be small enough to prevent microwave radiation from escaping through the openings. During the cooking process, crank-and-cam mechanism 62 translates the rotational movement from motor 61 into a linear reciprocating movement to move food surface 64a to and fro within cooking chamber 69. Food surface 64a can be moved on top of platform 63 via skids 65.

For the present embodiment, motor 61 and crank-and-cam mechanism 62 are utilized to translate a rotational movement to a linear reciprocating movement. It is understood by those skilled in the art that other mechanisms can be utilized to translate a rotational movement to a linear reciprocating movement, or to provide a linear reciprocating movement directly.

Operating parameters for microwave oven 60 to cook any food items placed within cooking cavity 69 can be entered via control panel 17 (from FIG. 1).

II. Controller

Modular cooking appliance 10 may include various oven types, but it is also able to be powered by a single-phase 50-Amp outlet as sole power source via a single power plug. Thus, modular cooking appliance 10 can be employed by any food service establishments without additional modification to the commonly found single-phase 50-Amp outlets.

Figure 7:
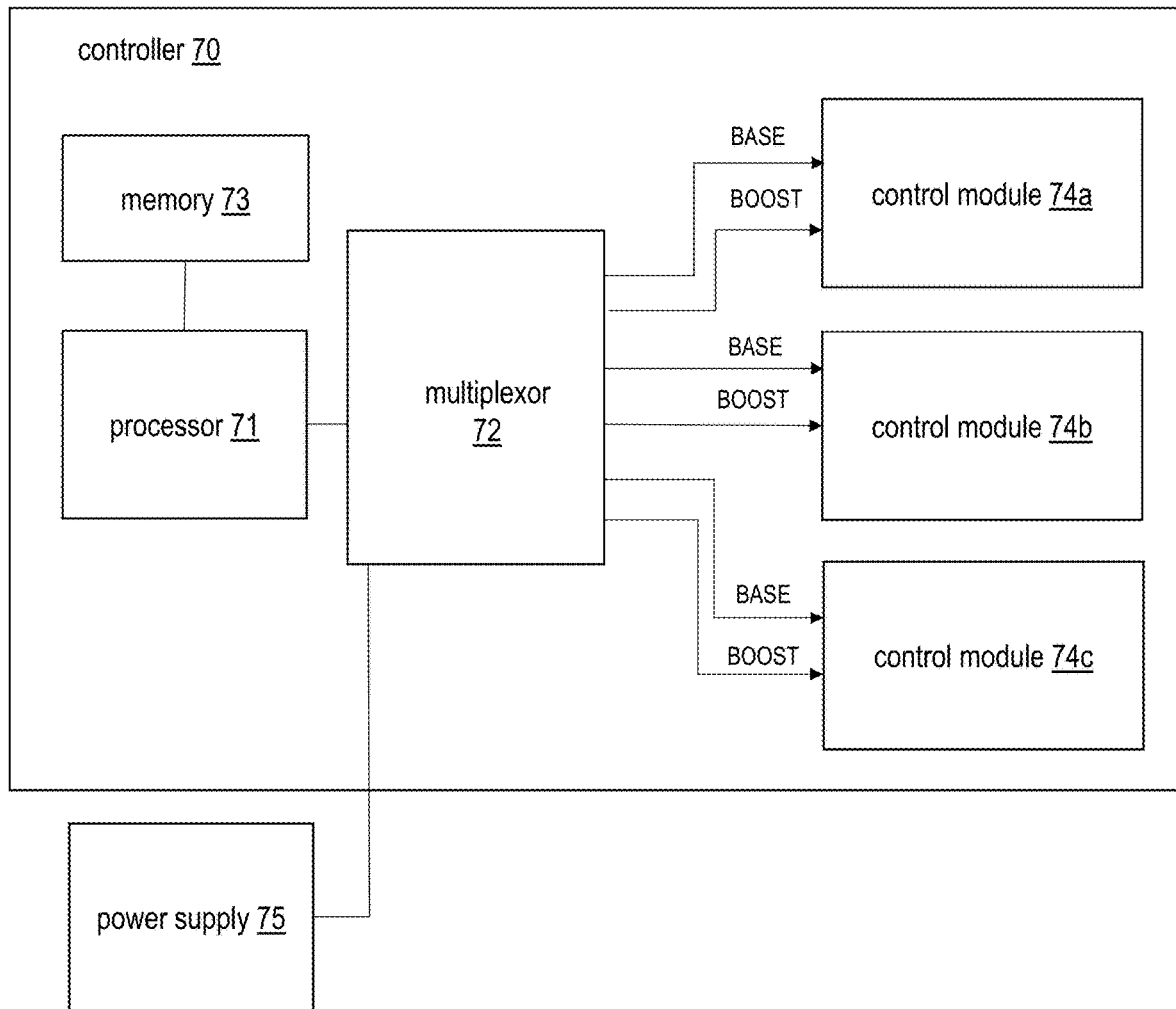
FIG. 7 is a block diagram of a controller for controlling various oven modules within the modular cooking appliance from FIG. 1, according to one embodiment.

Referring now to FIG. 7, there is depicted a block diagram of a controller for controlling various oven modules within modular cooking appliance 10, according to one embodiment. As shown, a controller 70 includes a processor 71, a multiplexor 72, a memory 73 and control modules 74a-74c. Memory 73 includes random-access memories and read-only memories that are non-erasable as well as electronically programmable. Software and data related to the operations of modular cooking appliance 10 are stored within memory 73. Control module 74a is associated with interchangeable cooking module 12a (from FIG. 1A), control module 74b is associated with interchangeable cooking module 12b, and control module 74c is associated with interchangeable cooking module 12c. During operation, control modules 74a-74c monitor the real-time current consumption of interchangeable cooking modules 12a-12c, respectively, and distribute current from a power supply 75 to interchangeable cooking modules 12a-12c and the associated ovens, as needed.

All ovens within modular cooking appliance 10 that cook with hot air, such as impingement oven 20 and convection oven 40, are provided with a base heater and at least one boost heater. For example, impingement oven 20 includes base heater 39a and boost heater 39b (see FIG. 3). All ovens within modular cooking appliance 10 that cook with microwaves, such as microwave oven 60, are provided with at least one magnetron. For example, microwave oven 60 includes magnetron 61 (see FIG. 6). If microwave oven 60 is provided with a second magnetron, it may be activated independently from magnetron 61.

III. Adaptive Power Management

As mentioned above, modular cooking appliance 10 is configured with impingement oven 20, convection oven 40 and microwave oven 60, for the present embodiment, with all the ovens operating from a single-phase 50-Amp outlet commonly found in commercial kitchens. However, those skilled in the art will appreciate that modular cooking appliance 10 may have any number and types of ovens all powered by a single power plug. For the present embodiment, the maximum current drawn by each of impingement oven 20, convection oven 40 and microwave oven 60 are as follows:

|  | component | max. current drawn |
|---|---|---|
| impingement oven 20 | base heater | 8 Amps |
|  | first boost heater | 12 Amps |
|  | second boost heater | 12 Amps |
| convection oven 40 | base heater | 4 Amps |
|  | first boost heater | 12 Amps |
|  | second boost heater | 12 Amps |
| microwave oven 60 | first magnetron | 8 Amps |
|  | second magnetron | 8 Amps |

In addition, the baseline current drawn by all the ancillary components (such as processor 71, multiplexor 72, memory 73, etc.) within modular cooking appliance 10 during operation is 5 Amps. Thus, with a 50-Amp power source, a maximum of (50−5=) 45 Amps current is available for powering ovens at any given time.

Needless to say, there are many benefits if more than one oven within modular cooking appliance 10 can be utilized to cook food items at the same time. However, as shown above, the maximum current drawn by impingement oven 20 is (8+12+12=) 32 Amps, and the maximum current drawn by convection oven 40 is (4+12+12=) 28 Amps. Thus, it is not possible to use both impingement oven 20 and convection oven 40 for cooking food items at the same time because the total current drawn by the two ovens (and all the ancillary components) would exceed the 50-Amp limitation.

In order to overcome the above-mentioned 50-Amp barrier, modular cooking appliance 10 employs Adaptive Power Management™ (APM) technology to intelligently allocate current to each of the ovens such that multiple ovens can be utilized for cooking food items concurrently during some of the time. There are two control modes under APM, namely, temperature-control mode and time-control mode.

A. Temperature-Control Mode

When cooking a food item under temperature-control mode, the oven temperature is monitored, and a temperature-control feedback loop is utilized to control the oven temperature for cooking the food item. Specifically, the base and boost heaters within an associated oven are turned on when the measured oven temperature drops below a set cook temperature, and the base and boost heaters within the associated oven are turned off when the measured oven temperature is at or above the set cook temperature.

During temperature-control mode, the amount of time an oven is turned on and the associated current drawn during the cook cycle are recorded and stored in a Current Drawn History Table (more details below) to be used in time-control mode described below, when necessary.

B. Time-Control Mode

When cooking a food item under time-control mode, the oven temperature and time for cooking the food item are guided by the information previously stored in a Current Drawn History Table (more details below). Specifically, the base and boost heaters within an associated oven are allocated the power during each time unit that was consumed by that oven for cooking the same food item when operating under temperature-control mode, as recorded in the Current Drawn History Table.

IV. Control Tables

The following three control tables are utilized by modular cooking appliance 10 to perform APM during various cook cycles. The control tables can be stored in memory 73 (from FIG. 7), and the information within some of the control tables will be updated throughout the course of operating modular cooking appliance 10.

A. Food Entry Table

Before modular cooking appliance 10 can be deployed for cooking different types of food items, information regarding these food items has to be entered and stored (i.e., preprogrammed) in a Food Entry Table (FET) within memory 73. The FET contains a list of all the food items that can be cooked via the various ovens within modular cooking appliance 10 and their respective optimal cook settings. Basically, for each food item intended to be cooked via modular cooking appliance 10, an operator needs to enter into the FET a food item name, an oven type and cook settings (such as cook time, blower speed, cook temperature, etc.) that are associated with the food item.

With reference now to FIG. 8A, there is depicted an example FET, according to one embodiment. In this FET example, four types of food items are listed, namely, pizza, sandwich, biscuits and hot dog. In addition, three separate cook stages are shown, and each cook stage contains cook settings such as start and stop times, cook temperature, blower speed and magnetron power level. Specifically, entry one and entry two include the cook settings for cooking pizza and sandwich, respectively, in an impingement oven (such as impingement oven 20). Entry three includes the cook settings for cooking biscuits in a convection oven (such as convection oven 40) and entry four includes the cook settings for cooking hot dog in a microwave oven (such as microwave oven 60).

For each of entry one through entry three, when the corresponding cook settings are deployed, the ovens will be engaged in hot air cooking, as indicated by the associated air temperatures and blower speeds. For entry four, when that cook setting is deployed, the microwave oven will be engaged in microwave cooking, as indicated by a magnetron setting greater than zero in stages 1 and 3.

B. Maximum Current Drawn Table

The Maximum Current Drawn Table contains the maximum current required for each of impingement oven 20, convection oven 40 and microwave oven 60 to cook various food items, corresponding to the food item list stored in the FET.

With reference now to FIG. 8B, there is depicted an example Maximum Current Drawn Table. As shown, the Maximum Current Drawn Table includes an oven module column, a food name column, and multiple cook stage columns. In this example, entry one includes the maximum current drawn by impingement oven 20 for cooking pizza for a duration of 90 seconds, which corresponds to entry one of the FET from FIG. 8A. Entry two includes the maximum current drawn by impingement oven 20 for cooking sandwich for a duration of 70 seconds, which corresponds to entry two of the FET from FIG. 8A. Entry three includes the maximum current drawn by convection oven 40 for cooking biscuits for a duration of 120 seconds, which corresponds to entry three of the FET from FIG. 8A. Entry four includes the maximum current drawn by microwave 60 for cooking hot dog for a duration of 90 seconds, which corresponds to entry four of the FET from FIG. 8A.

Figure 9:
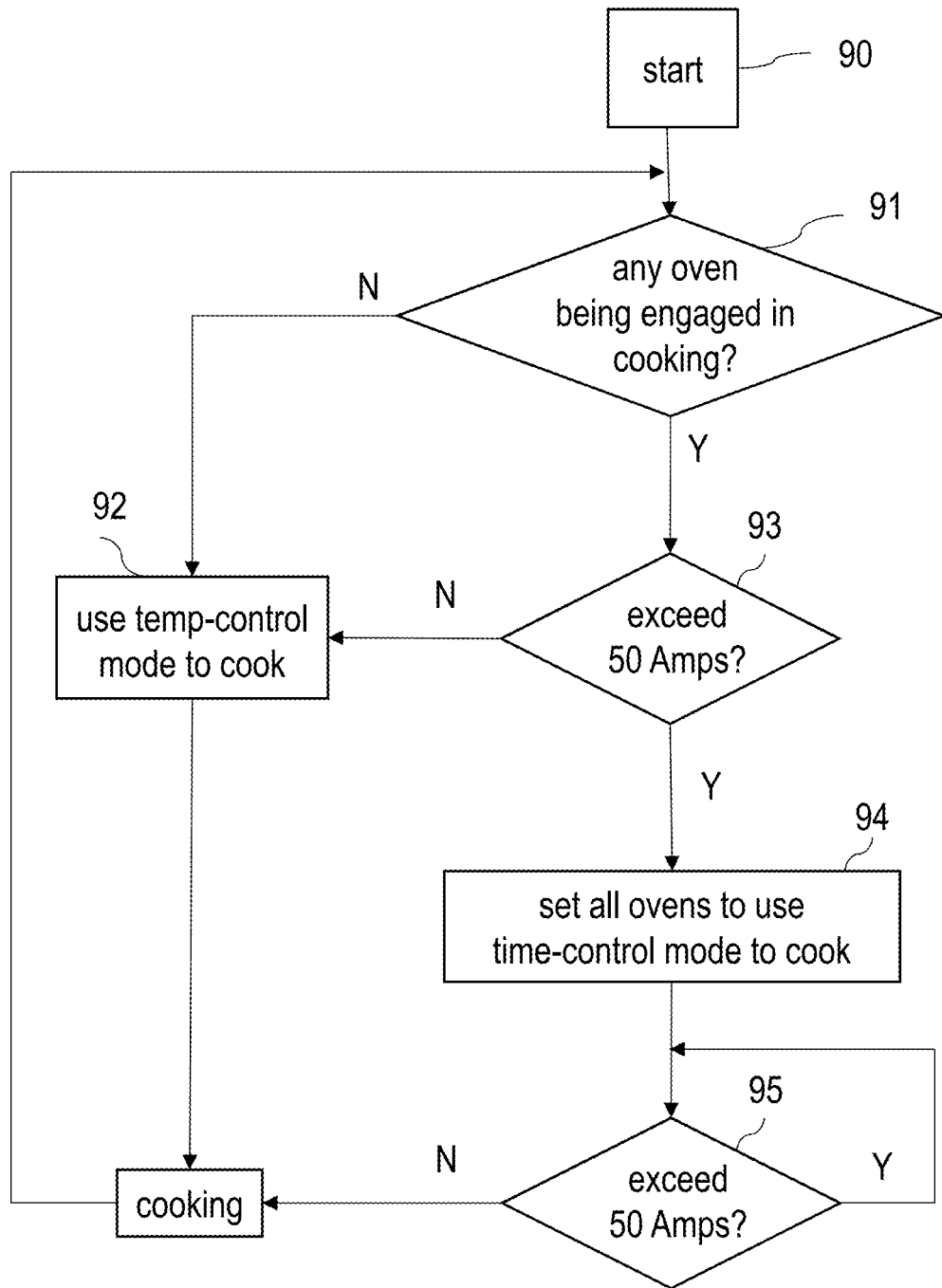
FIG. 9 is a flow diagram of a method for cooking food items via the modular cooking appliance from FIG. 1, according to one embodiment.

The information stored in the Maximum Current Drawn Table will be utilized to assist in the determination of whether or not a cook process should start when two or more ovens are called for cooking food items under temperature-control mode (as will be further explained in FIG. 9).

C. Current Drawn History Table

The Current Drawn History Table contains the current drawn by each of impingement oven 20 and convection oven 40 when it is engaged for cooking each type of food items under temperature-control mode per cook cycle.

With reference now to FIG. 8C, there is depicted an example Current Drawn History Table. As shown, the Current Drawn History Table includes an oven module column, a food name column, and multiple time unit columns. Each of the time units (time unit 1 to time unit 8 in this example) are identical in the length of time, and each time unit can be one second, two seconds, etc., depending the time resolution required and the memory available within modular cooking appliance 10. The current drawn by each of impingement oven 20 and convection oven 40 when it is engaged for cooking a specific food item is recorded and stored in various time units accordingly throughout its entire cook cycle.

The current drawn value recorded in each time unit can be a running average of the current drawn of the most recent 10 cooks of each food item. For example, the 3.2 Amps current drawn value in time unit 1 is a running average of the current drawn of the most recent 10 cooks of pizza in time unit 1 by impingement oven 20. An operator can change the number of cooks for calculating the running average, and more than 10 cooks can be utilized to calculate the running average, depending on the accuracy needed.

Basically, modular cooking appliance 10 learns how much current was recently required in each time unit to cook each food item type in each of impingement oven 20 and convection oven 40 when cooking under temperature-control mode.

It is expected that the current drawn value recorded in each time unit may be drastically different even for the same oven, depending on the geographic location of the oven. For example, the current drawn values for an oven located in Denver, Colo. is expected to be significantly higher than the same oven located in Dallas, Tex. Thus, before the Current Drawn History Table can be fully deployed for regular day-to-day operations, it has to be initialized and populated with some actual historic current drawn values by performing a minimum number of pre-cooks, such as 3, on location.

The information stored in the Current Drawn History Table will be utilized to assist in the determination of whether or not a cook process should be started when two or more ovens are called for cooking food items (as will be further explained in FIG. 9).

In addition, for each time unit, the activation status of the associated base heater and boost heater (not shown) can also be recorded and stored in the corresponding entry of the Current Drawn History Table.

IV. Cooking Process

With reference now to FIG. 9, there is depicted a flow diagram of a method for cooking food items via modular cooking appliance 10, according to one embodiment. The ovens within modular cooking appliance 10 depends on the user configuration, but for the present embodiment, the ovens are impingement oven 20, convection oven 40 and microwave oven 60. After an operator has selected a food item to be cooked from a list of food items (i.e., food items stored in a FET from FIG. 8) shown on display 17 (from FIG. 1), as shown in block 90, a determination is made whether or not any of the ovens is currently being engaged in cooking food items, as shown in block 91.

If none of the ovens is currently engaged in cooking food items, then temperature-control mode will be utilized for controlling the oven temperature of the selected oven to cook the selected food item throughout the entire cook process, as depicted in block 92. The cook cycle will be guided by the information stored within the FET.

However, if one (or more) oven is currently being engaged in cooking food items, then another determination is made whether or not the total current demand by the selected oven and the engaged oven (as well as the auxiliary components) to cook respective food items will exceed the 50-Amp limitation anytime during their entire respective cook cycle under temperature-control mode, as shown in block 93. This determination is made by looking up the Maximum Current Drawn Table to determine if the sum of the current drawn by the selected oven and the engaged oven (as well as the auxiliary components) for cooking their respective food item will exceed the 50-Amp limitation in any of the time units, for the same ovens cooking the same food types. If not, then the selected oven is allowed to cook the selected food immediately, and temperature-control mode can continually be used to control the oven temperature of the two ovens throughout the entire cook cycle, as depicted in block 92.

If the total current demand by the selected oven and the engaged oven (as well as the auxiliary components) to cook respective food items exceeds the 50-Amp limitation, then all the ovens will be set to use time-control mode for controlling oven temperature throughout the entire cook cycle, as depicted in block 94. In other words, any oven that is using temperature-control mode at the time will be switched to use time-control mode to complete the cook process.

For example, if a pizza is currently being cooked in impingement oven 20, and an operator wants to cook a biscuit in convection oven 40 at the same time, controller 70 checks the maximum current drawn by impingement oven 20 when cooking a pizza and the maximum current drawn by convection oven 40 when cooking a biscuit, by using the Maximum Current Drawn Table. In this example, the maximum current drawn by impingement oven 20 when cooking a pizza is 32 Amps, and the maximum current drawn by convection oven 40 when cooking a biscuit is 28 Amps, with a total maximum current drawn being (32+28=) 60 Amps, which means the cooking control within impingement oven 20 will be switched to time-control mode.

Next, a determination is made whether or not the total current demand by the selected oven and the engaged oven (as well as the auxiliary components) to cook respective food items will exceed the 50-Amp limitation anytime in any of the time units during their entire respective cook process under time-control mode, as shown in block 95. This determination is made by looking up the Current Drawn History Table to determine if the sum of the current drawn by the selected oven and the engaged oven (as well as the auxiliary components) does not exceed the 50-Amp limitation in each and every time unit throughout the entire cook cycle.

If the total current demand by the selected oven and the engaged oven (as well as the auxiliary components) to cook respective food items exceeds the 50-Amp limitation in any of the time units during their entire respective cook process under time-control mode, the selected oven has to wait until the total historic current drawn in each subsequent time unit is 50 Amps or less before it can start its cook process. Otherwise, if the total current demand does not exceed the 50-Amp limitation in any of the time units, both the selected oven and the engaged oven proceed with respective cooking under time-control mode.

For example, Table I (a portion of a Current Drawn History Table) shows it takes five time units for impingement oven 20 to cook a pizza, and the current drawn during the first to fifth time units are 20, 32, 32, 32 and 8 Amps, respectively. On the other hand, it takes three time units for convection oven 40 to cook a biscuit, and the current drawn during the first to third time units are 28, 16 and 16 Amps, respectively.

TABLE I

|  | time unit 1 | time unit 2 | time unit 3 | time unit 4 | time unit 5 |
|---|---|---|---|---|---|
| pizza | 20 | 32 | 32 | 32 | 8 |
| biscuit | 28 | 16 | 16 | | |

In this example, convection oven 40 can start cooking the biscuit in time unit 5 while the pizza is being cooked in impingement oven 20. This is because the current drawn by the two ovens and auxiliary components exceeds the 50-Amp limitation if biscuits begin cooking in any of time units 1-4 but not in time unit 5.

V. Uniform Operating Steps for Operators

The operating procedure is the same for all the ovens within modular cooking appliance 10.

For the present embodiment, modular cooking appliance 10 enters operating mode upon completion of oven startup, during which each of impingement oven 20, convection oven 40 and microwave oven 60 warm up to their preset operating temperatures. Once in operating mode, a listing of the various food items for which operating parameters have been entered via control panel 17 is displayed on control panel 17. An operator can select the food item to be cooked from among the items displayed on control panel 17 and places the food on a food loading mechanism of the corresponding oven. The food is then transported into the heated oven cavities for cooking.

After the cook process has been completed, the cooked food is transported from the oven cavities back to where the food entered the associated oven. The food loading mechanisms are not themselves heated, effectively concluding the cook process once the food exits the heated oven cavities.

However, because the food loading mechanisms are adjacent to the heated oven cavities contained in interchangeable cooking modules 12a-12c, residual heat from the heated oven cavities contained in interchangeable cooking modules 12a-12c serves to reduce the rate of heat loss experienced by the recently cooked food.

Food items may be concurrently cooked in impingement oven 20, convection oven 40 and microwave oven 60 of modular cooking appliance 10. Similar food items may be consecutively cooked in impingement oven 20, convection oven 40 and microwave oven 60 of modular cooking appliance 10. For example, pizzas may be cooked back to back to back in impingement oven 20 while cinnamon rolls are being cooked back to back to back in convection oven 40 while breakfast sandwiches are being cooked back to back to back in microwave oven 60. In order for the amount of heat energy delivered to the similar food items cooked consecutively in the various ovens to be the same in each of the back to back to back cooks when modular cooking appliance 10 is powered by an electric circuit of no more wattage than a typical single-phase 50-Amp outlet, the volumes of the cook cavities held within interchangeable cooking modules 12a-12c are no larger than 1.5 cubic feet for the convection oven, 1.25 cubic feet for the impingement oven and 1 cubic feet for the microwave oven.

As has been described, the present invention provides a modular cooking appliance having multiple ovens.

While the invention has been particularly shown and described with reference to a preferred embodiment, it will be understood by those skilled in the art that various changes in form and detail may be made therein without departing from the spirit and scope of the invention.

What is claimed is:

1. A method for cooking using a modular cooking appliance having a plurality of ovens, comprising:
   in response to one of said plurality of ovens being selected for cooking a food item, determining at least one of said plurality of ovens is currently being engaged in cooking;
   in response to determining at least one of said plurality of ovens is currently being engaged in cooking, determining a total current demand by said at least one engaged oven and said selected oven to cook respective food items exceeds a predetermined current limitation anytime during an entire cook cycles of said at least one engaged oven and an entire cook cycle of said selected oven under a temperature-control mode; and
   in response to determining said total current demand exceeds said predetermined current limitation, utilizing a time-control mode to control oven temperature of said at least one engaged oven throughout the entire cook cycle of said at least one engaged oven and oven temperature of said selected oven throughout the entire cook cycles of said selected oven, wherein said time-control mode comprises controlling oven temperature using previously stored information regarding current drawn by said engaged oven and said selected oven when engaged for cooking said respective food items.

2. The method of claim 1, wherein said plurality of ovens include an impingement oven and a convection oven.

3. The method of claim 1, wherein said predetermined current limitation is 50 Amps.

4. The method of claim 1, wherein said determining the total current demand by said at least one engaged oven and said selected oven to cook respective food items exceeds a predetermined current limitation is determined by using information stored within a Maximum Current Drawn Table.

5. The method of claim 1, further comprising:
   determining whether or not the total current demand by said at least one engaged oven and said selected oven to cook respective food items exceeds said predetermined current limitation in each and every time units during the entire cook cycle of said at least one engaged oven and the entire cook cycle of said selected oven under said time-control mode; and
   in response to determining the total current demand exceeds said predetermined current limitation, preventing said selected oven from starting cooking until a time unit such that the total current demand by said at least one engaged oven and said selected oven to cook respective food items does not exceed said predetermined current limitation in remaining time units.

6. The method of claim 5, wherein said determining whether or not the total current demand by said at least one engaged oven and said selected oven to cook respective food items exceeds said predetermined current limitation in each and every time units during the entire cook cycle of said at least one engaged oven and the entire cook cycle of said selected oven under said time-control mode is determined by using information stored within a Current Drawn History Table.

7. An apparatus for cooking, comprising:
   a housing containing a plurality of ovens;
   a control panel on said housing for receiving instructions from an operator; and
   a processor, within said housing,
      determines whether or not at least one of said plurality of ovens is currently being engaged in cooking, in response to an instruction to select one of said plurality of ovens for cooking a food item;
      utilizes temperature-control mode to control oven temperature of said selected oven throughout an entire cook cycle of said selected oven, in a determination that none of said plurality of ovens is currently being engaged in cooking;
      determines whether or not a total current demand by said at least one engaged oven and said selected oven to cook respective food items exceeds a predetermined current limitation anytime during an entire cook cycles of said at least one engaged oven and the entire cook cycle of said selected oven under said temperature-control mode, in a determination that at least one of said plurality of ovens is currently being engaged in cooking;
      utilizes said temperature-control mode to control oven temperatures of said at least one engaged oven throughout the entire cook cycle of said at least one engaged oven and oven temperature of said selected oven throughout the entire cook cycles of said selected oven, in a determination that said total current demand does not exceed said predetermined current limitation, then
      utilizing a time-control mode to control oven temperature of said at least one engaged oven throughout the entire cook cycle of said at least one engaged oven and oven temperature of said selected oven throughout the entire cook cycle of said selected oven, in a determination that said total current demand exceeds said predetermined current limitation, wherein said time-control mode comprises controlling oven temperature using previously stored information regarding current drawn by said at least one engaged oven and said selected oven when engaged for cooking said respective food items.

* * * * *